United States Patent [19]

Sakurai

[11] Patent Number: 4,824,900
[45] Date of Patent: Apr. 25, 1989

[54] RUBBER COMPOSITIONS FOR PNEUMATIC RADIAL TIRES

[75] Inventor: Mitsuo Sakurai, Hiratuska, Japan

[73] Assignee: The Yokohama Rubber Co., Ltd., Tokyo, Japan

[21] Appl. No.: 135,358

[22] Filed: Dec. 21, 1987

[30] Foreign Application Priority Data

Dec. 22, 1986 [JP] Japan ................................ 61-303965

[51] Int. Cl.$^4$ .......................... C08K 3/04; C08L 7/00; C08L 9/00; C08L 15/02
[52] U.S. Cl. ................................... 524/495; 525/233; 525/236; 525/237; 524/526
[58] Field of Search ................ 524/526, 495; 525/236, 525/237

[56] References Cited

U.S. PATENT DOCUMENTS

| | | | |
|---|---|---|---|
| 4,154,277 | 5/1979 | Sato et al. | 524/526 |
| 4,193,437 | 3/1980 | Powell | 524/526 |
| 4,433,094 | 2/1984 | Ogawa et al. | 524/526 |
| 4,555,547 | 11/1985 | Ueda et al. | 525/236 |
| 4,567,225 | 1/1986 | Misawa et al. | 524/526 |

Primary Examiner—Allan M. Lieberman
Attorney, Agent, or Firm—Finnegan, Henderson, Farabow, Garrett & Dunner

[57] ABSTRACT

A rubber composition for use in pneumatic radial tires is disclosed which comprises specified amounts of polybutadiene rubber, natural rubber and/or polyisoprene rubber and carbonblack. The polybutadiene rubber has in the molecular chain at least one atomic group of the formula

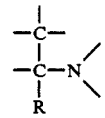

wherein R is OH or SH and the carbonblack has a selected iodine adsorption, whereby a radial tire is rendered highly resistant to flex, to crack growth and to external damage and extremely low in hysteresis loss and in rolling resistance.

2 Claims, No Drawings

RUBBER COMPOSITIONS FOR PNEUMATIC RADIAL TIRES

BACKGROUND OF THE INVENTION

1. Field of the Invention

This invention relates to rubber compositions suitable for use in pneumatic radial tires.

2. Prior Art

Resource and energy saving has been a great concern during the recent years, and to meet with this trend, automobile tire manufacturers have directed their research and development efforts to reducing hysteresis loss of tire materials to a minimum possible extent and at the same time to providing light-weight tire products by reducing the amount of rubber materials used for the various portions of the tire. From the functional point of view of an automobile tire, greater efforts have been paid in minimizing hysteresis loss of inter alia the tread rubber compositions, but this has nearly reached its critical point and hysteresis improvements are now being sought in other portions of the tire such as sidewalls so as to reduce its rolling resistance.

The sidewall portion of a tire has an important roll to protect the tire carcass against external damage, and the rubber material for that tire portion is required to possess such mechanical properties as resistance to flex and crack growth and resistance to abrasion on contact for example with curbstones and other obstructions on the road.

Polybutadiene rubber (BR) less abundant in 1,2-vinyl bonds is known to exhibit high resistance to flex and crack growth, whilst natural rubber (NR) is strong against external wear.

Generally, the sidewall of a passenger car tire has an elastomer content of NR and BR in a ratio of preferably 3/7 - 7/3 depending upon the particular tire performance required.

Most frequent source of damage to the sidewalls of passenger cars is found in abrasion with the curbstone of the road, but such damage is relatively minor because the speed of the car is normally slow when rubbing against the curbstone as compared to heavy load trucks. Therefore, it is more to flex and crack growth than to external damage that attention should be directed from the safety point of view.

The sidewalls of the passenger car tire have been constructed with sometimes HAF but more widely with carbonblack of a relatively low reinforcement such as GPF and FEF as rubber materials containing such carbonblack present relatively small hysteresis loss. However, it has now been found imperative to minimize the use of carbonblack for the sidewall of the tire so as to reduce the rolling resistance in an effort to achieve the ultimate objective of resource and energy saving. This in turn leaves the problem that reduction in carbonblack will necessarily lead to vulnerability of the sidewall to external damage.

SUMMARY OF THE INVENTION

It is therefore the primary object of the present invention to provide a pneumatic radial tire for automobiles which is excellent in resistance to flex and crack growth as well as to external damage and extremely low in hysteresis loss and hence in rolling resistance.

A more specific object of the invention is to provide a rubber composition suitable for a tire sidewall (or even tread) comprising a specified amount of polybutadiene rubber, a specified amount of natural rubber and/or polyisoprene rubber and a specified amount of carbonblack. Even more specifically, the invention provides a rubber composition for tire sidewalls which comprises 70-30 parts by weight of polybutadiene rubber, 30-70 parts by weight of natural rubber and/or polyisoprene rubber and 25-55 parts by weight of carbonblack per 100 weight parts of the rubber component, said polybutadiene rubber containing less than 20 weight percent of 1,2-vinyl bonds, and more than 30 weight parts of said polybutadiene rubber having in the molecular chain at least one atomic group of the formula

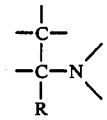

wherein R is OH or SH and said carbonblack having an iodine adsorption of 30-50 mg/g.

It has been found that less than 30 weight parts BR would result in insufficient flex and crack growth resistance, while BR exceeding 70 weight parts would lead to vulnerability to external damage or wear of the sidewall.

NR and/or polyisoprene rubber (IR) if smaller than 30 weight parts would result in insufficient resistance to abrasive wear of the sidewall and if larger than 70 weight parts would lead to less resistance to flex and crack growth than allowable.

It has been further found that more than 20 weight percent of 1,2-vinyl bonds in BR would result in greater rolling resistance and in reduced resistance to flex and crack growth and to external damage of the sidewall. Amounts of reformed BR less than 30 weight parts would not appreciably reduce the rolling resistance. Less carbonblack than 25 weight parts would show no appreciable increase in resistance to external damage or abrasion and greater carbonblack than 55 weight parts would lead to increased rolling resistance. Iodine ($I_2$) adsorption to carbonblack if smaller than 30 mg/g would fail to protect the sidewall of the tire against abrasive wear and if greate than 50 mg/g would not be effective in reducing the rolling resistance, given reformed BR.

NR and/or IR used for the sidewall can be blended with other rubbers like elastomers with low unsaturated bond contents such as halogenated isobutylene/isoprene copolymers and ethylene/propylene copolymers thereby improving weather-proofness such as to ozone. Alternatively, there may be blended styrene/butadiene copolymers where cut-proofing is particularly called for. There may be further blended two or more diene rubbers where the two qualities for the sidewall are required. Any of such blends should be in amounts of 30-70 weight parts. Importantly in any case, there should exist at least 30 weight parts of NR and/or IR.

The invention will be further described by way of the following examples.

Inventive Example 1 & Comparative Example 1

A one-ply carcass tire of 165 SR 13 size was prepared, having a side-tread composed of each of the two different material formulations shown in Table 1.

Inventive example 2 & Comparative Example 2

A two-ply carcass tire of 185 SR 14 size was produced with its side-tread composed of each of the two different formulations shown in Table 1.

Comparative Examples 3 and 4

A one-ply carcass tire of 165 SR 13 size and a two-ply carcass tire of 185 SR 14 size were produced in Comparative Example 3 and 4 respectively, with their respective side-tread compositions shown in Table 1.

The tires as produced in the above Examples were tested for their respective rolling resistance on an indoor drum of 1707 mm diameter at a speed of 80 km/hr with an air pressure of 1.9 kg/cm² and under a load of 420 g. the rolling resistance in each Example is represented by index on the basis of 100 given in Comparative Examples 1 and 2, the smaller the index, the lower is the rolling resistance.

Having thus described the invention, it will be understood that various changes and modifications may be made in the specific embodiment advanced herein without departing from the scope of the appended claims.

TABLE

| Formulations | Comparative Example 1 | Example 1 | Comparative Example 2 | Example 2 | Comparative Example 3 | Comparative Example 4 |
|---|---|---|---|---|---|---|
| NR | 60 | 60 | 40 | 40 | 60 | 40 |
| BR*¹ | 40 | | 60 | | | |
| reformed BR*² | | 40 | | 60 | | |
| reformed BR*³ | | | | | 40 | 60 |
| zinc oxide | 5 | 5 | 3 | 3 | 5 | 3 |
| stearic acid | 2 | 2 | 2 | 2 | 2 | 2 |
| antioxidant*⁴ | 3 | 3 | 3 | 3 | 3 | 3 |
| wax | 2 | 2 | 2 | 2 | 2 | 2 |
| carbonblack (GPF)*⁵ | 40 | 40 | | | 40 | |
| carbonblack (FEF)*⁶ | | | 50 | 50 | | 50 |
| aromatic oil | 5 | 5 | 5 | 5 | 5 | 5 |
| accelerator*⁷ | 1 | 1 | 1 | 1 | 1 | 1 |
| sulfur | 1.5 | 1.5 | 1.5 | 1.5 | 1.5 | 1.5 |
| rolling resistance | 100 | 97 | 100 | 95 | 98 | 97 |

Note:
*¹microstructure by infrared spectrophotometry, cis 37%, trans 50%, 1,2-vinyl 13%
*²microstructure by infrared spectrophotometry, cis 37%, trans 50%, 1,2-vinyl 13%, atomic group bonded

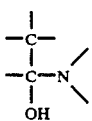

*³microstructure by infrared spectrophotometry, cis 37%, trans 50%, 1,2-vinyl 13%, atomic group bonded

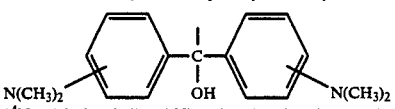

*⁴N—1,3-dimethylbutyl-N'—phenyl-p-phenylenediamine
*⁵iodine adsorption 36 mg/g
*⁶iodine adsorption 43 mg/g
*⁷N—oxydiethylenebenzothiazole-2-sulfenamide

What is claimed is:

1. A rubber composition for automobile tires which comprises a rubber component of from 70 to 30 parts by weight of polybutadiene rubber and from 30 to 70 parts by weight of at least one rubber selected from the group consisting of natural rubber and polyisoprene rubber and from 25 to 55 parts by weight of carbonblack per 100 weight parts of the rubber component, said polybutadiene rubber containing less than 20 weight percent of 1,2-vinyl bonds, and more than 30 weight parts of said polybutadiene rubber having in the molecular chain at least one atomic group of the formula

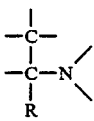

wherein R is OH or SH and said carbonblack having an iodine adsorption of from 30 to 50 mg/g.

2. A rubber composition for automobile tires which comprises a rubber component of from 70 to 30 parts by weight of polybutadiene rubber and from 30 to 70 parts by weight of a rubber blend comprising at least 30 weight parts of natural rubber and at least 30 weight parts of polyisoprene rubber with the balance being a copolymer rubber selected from the group consisting of halogenated isobutylene/isoprene rubber, ethylene/propylene rubber, styrene/butadiene rubber and combinations thereof and from 25 to 55 parts by weight of carbonblack per 100 weight parts of the rubber component, said polybutadiene rubber containing less tha 20 weight percent of 1,2-vinyl bonds, and more than 30 weight parts of said polybutadiene rubber having in the molecular chain at least one atomic group of the formula

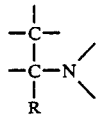

wherein R is OH or SH and said carbonblack having an iodine adsorption of from 30 to 50 mg/g.